(12) United States Patent
Yano et al.

(10) Patent No.: US 8,958,682 B2
(45) Date of Patent: Feb. 17, 2015

(54) IMAGING DEVICE

(75) Inventors: Shuji Yano, Osaka (JP); Norihisa Motoori, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1111 days.

(21) Appl. No.: 12/513,909

(22) PCT Filed: Nov. 2, 2007

(86) PCT No.: PCT/JP2007/071390
§ 371 (c)(1),
(2), (4) Date: May 7, 2009

(87) PCT Pub. No.: WO2008/056606
PCT Pub. Date: May 15, 2008

(65) Prior Publication Data
US 2010/0034521 A1 Feb. 11, 2010

(30) Foreign Application Priority Data
Nov. 7, 2006 (JP) .................. 2006-301158

(51) Int. Cl.
*H04N 5/77* (2006.01)
*H04N 5/232* (2006.01)
(Continued)

(52) U.S. Cl.
CPC ............ *H04N 5/772* (2013.01); *H04N 5/232* (2013.01); *H04N 9/7921* (2013.01); *H04N 5/781* (2013.01); *H04N 9/8042* (2013.01)
USPC ........................................ 386/224; 386/225

(58) Field of Classification Search
CPC ..... H04N 5/772; H04N 1/2112; H04N 5/907; H04N 2101/00; H04N 5/765; H04N 7/181; H04N 17/06; H04N 5/77; H04N 9/8042; G11B 27/105; G06B 13/19645; G06B 13/19667
USPC .................................. 386/224–226
See application file for complete search history.

(56) References Cited

U.S. PATENT DOCUMENTS 5,821,991 A * 10/1998 Kwok .............................. 348/96
6,636,687 B1 * 10/2003 Ando et al. .................... 386/281
(Continued)

FOREIGN PATENT DOCUMENTS

JP 6-169419 6/1994
JP 11-88827 3/1999
(Continued)

OTHER PUBLICATIONS

International Preliminary Report on Patentability issued May 26, 2009 in International (PCT) Application No. PCT/JP2007/071390.
(Continued)

*Primary Examiner* — Nigar Chowdhury
(74) *Attorney, Agent, or Firm* — Wenderoth, Lind & Ponack, L.L.P.

(57) ABSTRACT

A imaging device (10) includes an imaging section (101) for imaging a subject at either one of a first period (high speed) and a second period (ordinary speed) of longer than the first period, an operating section (110) for setting the imaging period of the imaging section, a storing section (105) for storing the video signal imaged at the first period, a converting section (104) for converting the video signal of the first period imaged by the imaging section into a video signal of the second period, a recording section (107) for recording therein the video signal from the converting section or the storing section with the recorded video signal divided and managed in a plurality of reproducing regions, and a reproduction sequence generating section (112) for generating a reproduction sequence signal showing the reproduction sequence of each reproducing region of the video signal recorded in the recording section. After the video signal from the converting section (104) is recorded in the recording section, the video signal recorded in the storing section (105) is recorded in the recording section.

20 Claims, 14 Drawing Sheets

(51) Int. Cl.
*H04N 9/79* (2006.01)
*H04N 5/781* (2006.01)
*H04N 9/804* (2006.01)

(56) References Cited

U.S. PATENT DOCUMENTS

| | | | |
|---|---|---|---|
| 8,265,455 B2 * | 9/2012 | Shinkai | 386/248 |
| 2003/0206714 A1 | 11/2003 | Ando et al. | |
| 2003/0219238 A1 * | 11/2003 | Yamaguchi et al. | 386/131 |
| 2004/0212690 A1 * | 10/2004 | Nakase et al. | 348/222.1 |
| 2005/0089313 A1 * | 4/2005 | Wada et al. | 386/117 |
| 2007/0007347 A1 * | 1/2007 | Yahagi et al. | 235/454 |

FOREIGN PATENT DOCUMENTS

| | | |
|---|---|---|
| JP | 2002-94947 | 3/2002 |
| JP | 2005-295423 | 10/2005 |

OTHER PUBLICATIONS

International Search Report issued Feb. 26, 2008 in the International (PCT) Application No. PCT/JP2007/071390.

* cited by examiner

IMAGING DEVICE

TECHNICAL FIELD

The present invention relates to an imaging device, and more particularly to an imaging device capable of recording image at several speeds.

BACKGROUND ART

Recently, as the imaging element is advanced in function, the function of the video camera is diversified. For example, a CMOS type imaging element is used in a video camera, and high-speed reading or partial reading of video signals may be easier, and a slow-motion function capable of recording at higher speed and reproducing is realized. However, to realize the slow-motion function, it is required to handle signals at data rate several times higher than in the standard system. To realize the slow-motion function, therefore, a special structure other than the imaging element and its driving method are needed.

To solve the problems, for example, patent document 1 discloses a method. FIG. 14 shows a configuration of an imaging device disclosed in patent document 1. The imaging device shown in FIG. 14 has a high-speed imaging function for imaging at higher speed (for example, three times higher) than in ordinary mode, in addition to the imaging operation at ordinary speed.

An imaging section 1401 includes an imaging element, its drive circuit, and an analog signal processing circuit. The imaging section 1401 converts an optical image signal into an electrical signal and outputs the electrical signal as an output. An A/D converter 1402 converts an analog video signal, that is, the output signal from the imaging section 1401, into a digital video signal, and feeds it into a camera signal processing circuit 1403. The camera signal processing circuit 1403 processes the signals as required in an ordinary camera, such as gain adjustment, gamma correction or contour correction, and the output signals become video signal of standard form to be recorded and displayed.

In the case of three-times-high-speed imaging, as compared with ordinary speed, for example, video signal of 60 fields per second, it is necessary to generate video signals of 180 fields per second. In the imaging section 1401, when a signal charge is imaged out at three times of ordinary speed from the imaging element, video signals are output in every $1/180$ second, that is, $1/3$ time of ordinary mode. To handle this imaging signal, the A/D converter 1402 and the camera signal processing circuit 1403 must operate at three times of ordinary speed.

The output from the camera signal processing circuit 1403, that is, the video signal of three times of ordinary speed is compressed in a compression circuit 1405. The compressed video data is recorded in a recording medium 1406. The recording operation of the recording medium 1406 is controlled by a control circuit 1408, and is recorded at three times of ordinary speed. That is, the video data of one field portion is recorded in every $1/180$ second.

The video imaged at high speed is reproduced by "slow reproduction" operation as explained below. In reproduction, the control circuit 1408 controls the recording medium 1406, and reads out the data from the recording medium 1406 at a rate of 60 fields per second, same as in ordinary video signal. The output data is decoded in an decompression circuit 1407 by reverse processing of data compression, and is returned to a form of video signal. As a result, the video signal is output in every $1/60$ second, same as in the ordinary mode, and the video signal expanded three times in the time axis as compared with the imaging time is obtained.

In high-speed imaging of three times of ordinary speed, the video signal of three times of speed output from the camera signal processing circuit 1403 is recorded in the recording medium 1406 as mentioned above, and is simultaneously supplied into a speed converting circuit 1404, and is converted into a video signal of ordinary speed. This video signal is displayed as a monitor image during imaging process. The speed converting circuit 1404 extracts video signals at a rate of three fields to one field, from the video signal of 180 fields per second, and produces a video signal of 60 fields per second.

A selector 1409 selects the video signal to be sent to an output terminal 1410, and specifically selects an a-side signal at the time of high-speed imaging, and a b-side signal at the time of slow reproduction. That is, at the time of high-speed imaging, the video signal of three times of speed is recorded in the recoding medium 1406, and the video signal converted to ordinary speed is simultaneously output, so that the image being imaged can be displayed on the monitor. When reproducing the video imaged at high speed, the video signal recorded in the recording medium 1406 is reproduced at $1/3$ speed of recording speed, so that a slow reproduction signal can be obtained.

Patent document 1: JP-A-2005-295423.

SUMMARY OF THE INVENTION

In the conventional imaging device having such configuration, the following problems are known. The recording medium 1406 must be applicable to high-speed processing corresponding to the high-speed imaging. Since a volatile semiconductor memory such as SDRAM capable of realizing high-speed process easily and inexpensively cannot hold the data when the power source is cut off, it is not suited to the recording medium 1406. When desired to hold the imaged data permanently, it is desired to use a non-volatile memory such as flash memory, an optical disk such as DVD (digital versatile disk), or hard disk, as the recording medium 1406.

However, writing at high speed, several times higher than ordinary speed is not easy as compared with the SDRAM or the like due to structural problems, or even if possible, expensive parts are required, and the cost is increased substantially. As for the compression circuit 1405, too, in high-speed imaging operation, the operation frequency must be raised several times higher than in ordinary-speed operation. When the compression circuit 1405 is modified to be applicable to high-speed operation frequency, the circuit becomes complicated, and cost is increased, and the power consumption is increased due to high operation frequency.

The present invention is devised to solve these problems, and it is hence an object thereof to present an imaging device capable of recording the video at high speed and reproducing the video recorded at high speed by slow reproduction, and more particularly an imaging device manufactured at low cost.

A first imaging device according to the invention includes: an imaging section for imaging a subject at either one (period/speed) of a first period (a first speed) and a second period (a second speed smaller than the first speed) longer than the first period; an operating section for setting an imaging period of the imaging section at a first period or a second period; a storing section for storing a video signal imaged at the first period; a converting section for converting the video signal of the first period imaged by the imaging section to a video signal of the second period; a recording section for recording the video signal from the converting section or the storing section therein, the recorded video signal being divided and managed in a plurality of reproducing regions; and a reproduction sequence generating section for generating a reproduction sequence signal showing the reproduction sequence of each reproducing region of the video signal recorded in the recording section. The reproduction sequence signal is recorded in the recording section. The video signal stored in the storing section is recorded in the recording section at a different timing from the timing the video signal from the converting section is recorded in the recording section.

A second imaging device according to the invention includes: an imaging section for imaging a subject at a first period or a second period longer than the first period; an operating section for setting an imaging period of the imaging section at a first period or a second period; a storing section for storing a video signal imaged at the first period; a recording section for recording the video signal from the imaging section or the storing section therein, the recorded video signal being divided and managed in a plurality of reproducing regions; and a reproduction sequence generating section for generating a reproduction sequence signal showing the reproduction sequence of each reproducing region of the video signal recorded in the recording section. The reproduction sequence signal is recorded in the recording section. The video signal stored in the storing section is recorded in the recording section at a different timing from the timing the video signal from the imaging section is recorded in the recording section.

According to the imaging device of the present invention, the video imaged at high speed during imaging operation at high speed (first period) is stored in the storing section, and then transferred and recorded in the recording section. Hence, during high-speed imaging operation, high speed is not required in the recording section, and expensive parts for high-speed operation are not needed in the recording section, and the operation speed is not required to be high. Thus, high-speed imaging is realized at low cost, nearly the same as that of the conventional imaging device. Further, since high operation frequency is not used, the power consumption is not increased. At the time of imaging, the reproduction sequence signal generated by the reproduction sequence generating section is recorded, and at the time of reproducing, therefore, the reproduction operation can be done without interruption from reproduction of video imaged at ordinary speed to reproduction of video imaged at high speed, that is, slow reproduction.

DESCRIPTION OF THE REFERENCE NUMERALS

Figure 1:
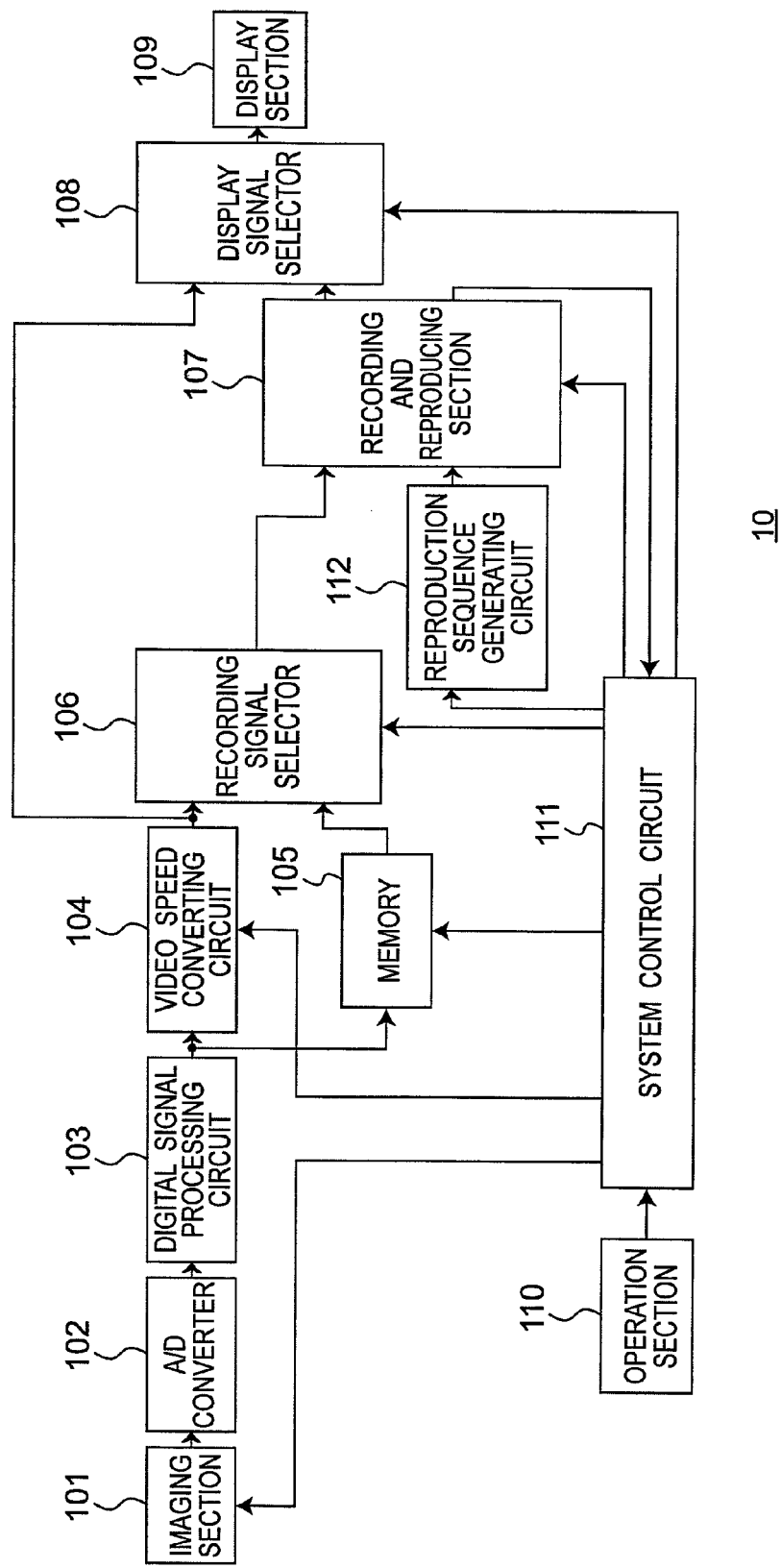
FIG. 1 is a block diagram of configuration of an imaging device in embodiment 1 of the present invention.

10, 10b Imaging device
101 Imaging section
102 A/D converter
103 Digital signal processing circuit
104 Video speed converting circuit
105 Memory
106 Recording signal selector
107 Recording and reproducing section
108 Display signal selector
109 Display section
110 Operation section
111 System control circuit
112 Reproduction sequence generating circuit
201 CCD
202 Drive circuit
203 Analog signal processing circuit
501 Compression circuit
502 Interface circuit
503 Recording medium
504 Decompression circuit
801 Memory
802 Read/write control circuit

DETAILED DESCRIPTION OF THE INVENTION

Referring now to the accompanying drawings, preferred embodiments of the present invention are specifically described below.

Embodiment 1

1. Configuration of Imaging Device

Figure 2:
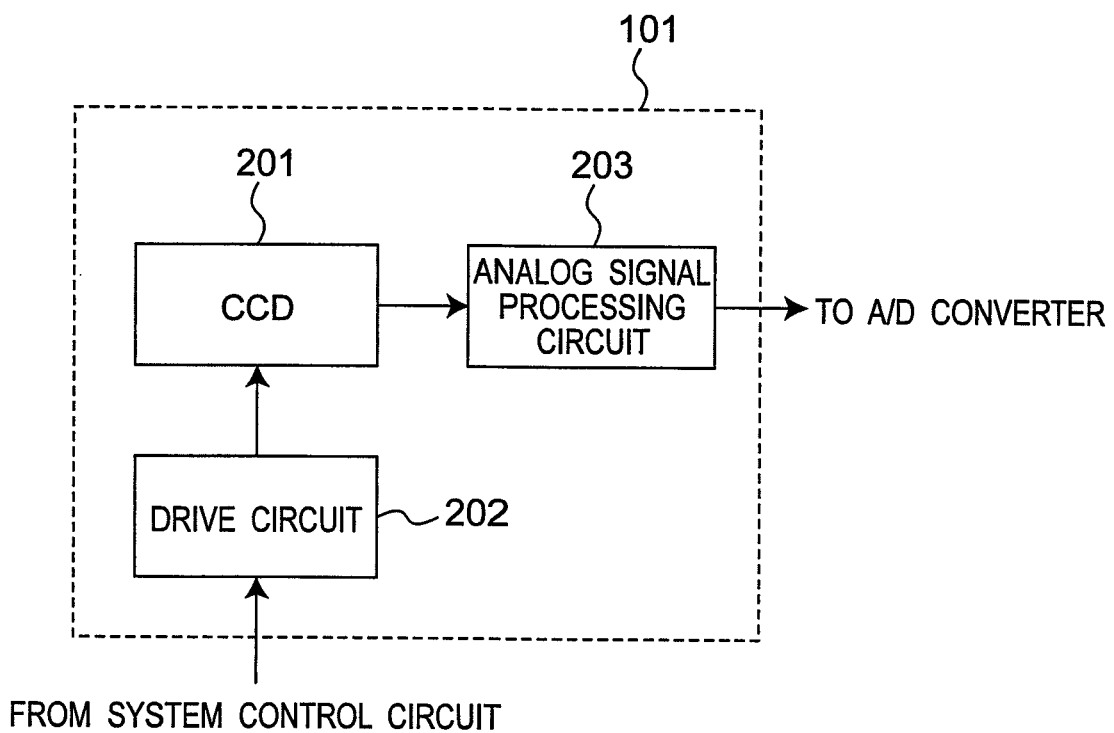
FIG. 2 is a block diagram of an example of configuration of an imaging section of the imaging device.

FIG. 1 is a block diagram of configuration of an imaging device in an embodiment of the present invention. In an imaging device 10 shown in FIG. 1, an imaging section 101 is imaging means capable of imaging at two speeds including ordinary speed and high speed. As shown in FIG. 2, the imaging section 101 includes an imaging element 201 such as CCD (charge coupled device), a drive circuit 202 for the imaging element 201, and an analog signal processing circuit 203 for processing the signal from the imaging element 201 in a specified manner.

An A/D converter 102 converts the analog signal output from the imaging section 101 into a digital signal. A digital signal processing circuit 103 applies a predetermined process necessary for ordinary camera operation to the digital signal output from the A/D converter 102.

Figure 3:
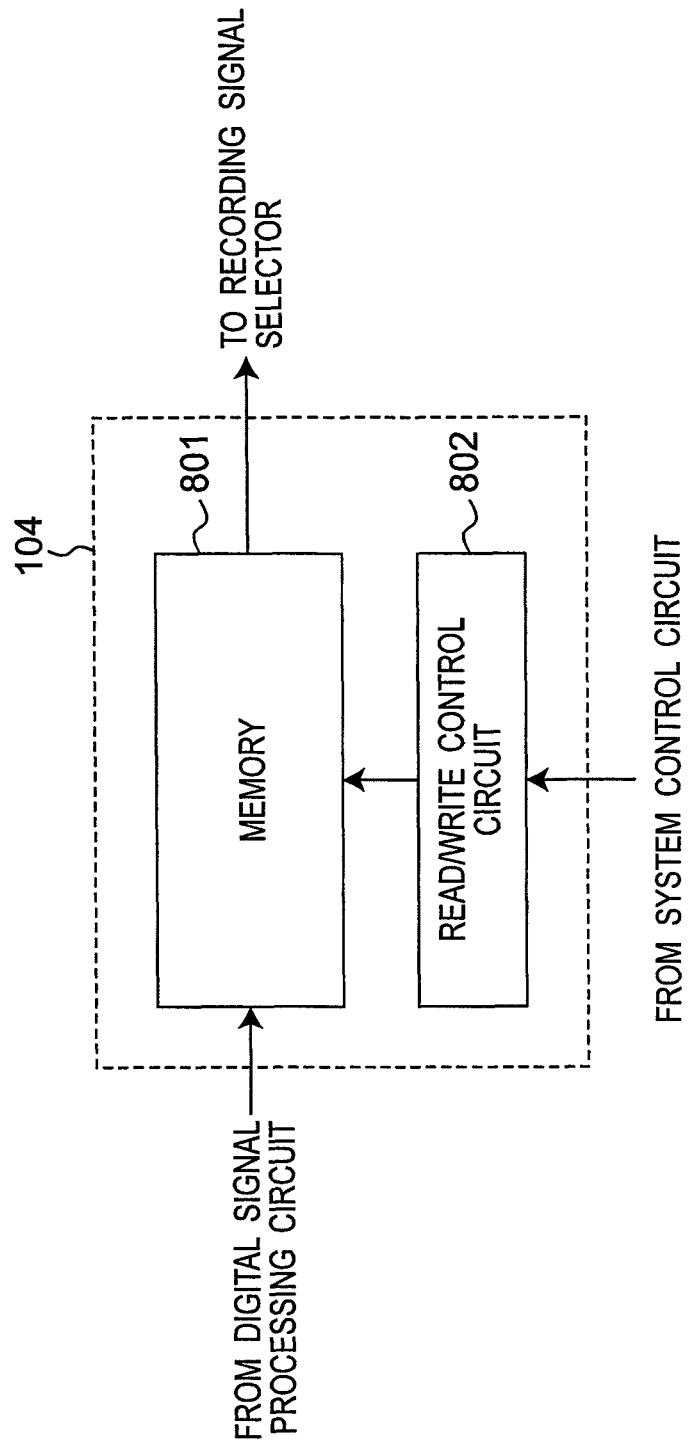
FIG. 3 is a block diagram of configuration of a video speed converting circuit of the imaging device.

A video speed converting circuit 104 converts the imaging speed of the output from the digital signal processing circuit 103. FIG. 3 shows an example of configuration of the video speed converting circuit 104. The video speed converting circuit 104 includes a memory 801, and a read/write control circuit 802 for controlling reading and writing of the memory 801. When receiving a control signal for speed conversion from a system control circuit 111, the read/write control circuit 802 writes the video signal imaged at high-speed of 240 fields per second in the memory 801 at 60 fields per second while thinning at specified intervals. At the same time, the read/write control circuit 802 reads out the video signal from the memory 801 at ¼ speed of the input video signal, that is, at a speed of 60 fields per second. In this manner the speed is converted.

A memory 105 stores the output of the digital signal processing circuit 103 for a specified number of fields (n fields) depending on the capacity of the memory 105. Preferably, the memory 105 may be composed of an inexpensive storage device capable of processing at high speed. For example, the memory 105 may be composed of a volatile memory capable of accessing at high speed such as SDRAM.

A recording signal selector 106 selects and outputs one of the output from the video speed converting circuit 104 and the output from the memory 105.

Figure 4:
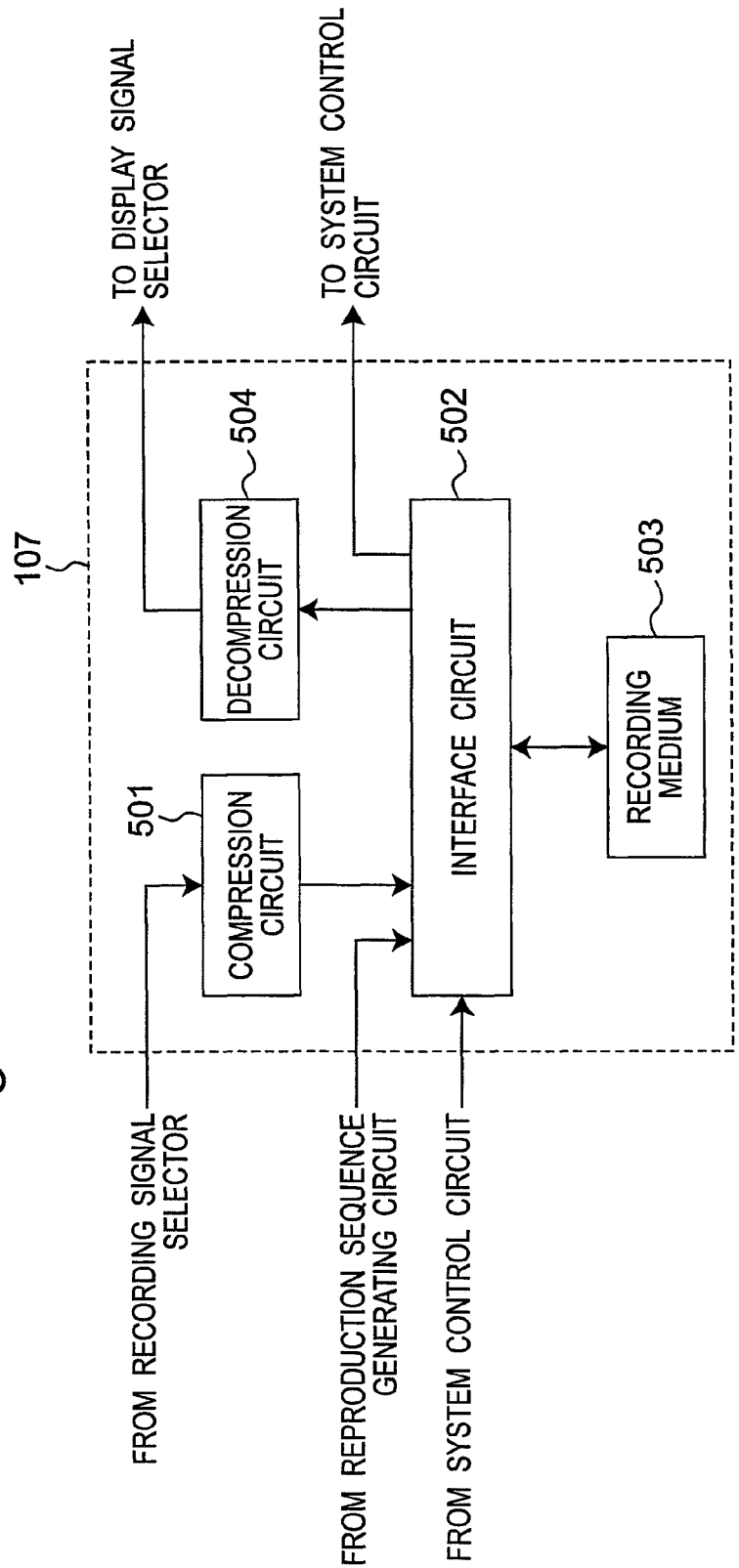
FIG. 4 is a block diagram of configuration of a recording and reproducing section of the imaging device.

A recording and reproducing section 107 includes a recording medium, and records the output from the recording signal selector 106 into the recording medium, and reproduces the video from the recording medium. FIG. 4 shows an example of configuration of the recording and reproducing section 107. The recording and reproducing section 107 includes a compression circuit 501 for compressing the image data, a recording medium 503 for recording the compressed image data, an interface circuit 502 for input and output of data in the recording medium 503, and a decompression circuit 504 for expanding the compressed data being read out from the recording medium 503. The recording medium 503 may be non-volatile memory such as flash memory, optical disk such as DVD, or hard disk.

A display signal selector 108 selects and outputs either one of the output signal from the video speed converting circuit 104 and the reproduction signal from the recording and reproducing section 107. A display section 109 displays the output video signal from the display signal selector 108.

An operation section 110 has some buttons and switches manipulated by the user for setting or changing control to be executed by a system control circuit 111. The system control circuit 111 controls the imaging section 101, the video speed converting circuit 104 and the memory 105 according to the operation signal from the operation section 110, controls the signal selected by the recording signal selector 106 or the display signal selector 108, and controls the recoding and reproducing section. A reproduction sequence generating circuit 112 is controlled by the system control circuit 111 to generate a signal showing the reproduction sequence of video signals to be reproduced by the recording and reproducing section 107.

2. Operation of Imaging Device

In the imaging device 10 of the embodiment having such configuration, the video recording operation and the video reproducing operation are explained below by referring to the drawings, respectively.

2.1 Imaging Operation

In FIG. 1, the imaging section 101, the A/D converter 102, and the digital signal processing circuit 103 are general constituent elements necessary for an ordinary camera, and they operate same as in an ordinary camera. That is, the imaging section 101 converts an optical image signal into an electrical signal, and delivers the electrical signal.

The A/D converter 102 converts the analog video signal from the imaging section 101 into a digital video signal, and sends out into the digital signal processing circuit 103. The digital signal processing circuit 103 processes the input signal as specified necessary for ordinary camera by offset adjustment, gain adjustment or gamma correction, and sends into a later stage.

The imaging device 10 of the embodiment has two imaging modes different in imaging speed. One is "ordinary-speed imaging mode" which is a mode for imaging at 60 fields per second, that is, at 1/60 second interval (period), for example. The other is "high-speed imaging mode" which is a mode for imaging at higher speed than that in the ordinary-speed imaging mode (in this example, at four times of speed). The high-speed imaging mode is started when the user manipulates the operation section 110 for instructing high-speed imaging (by pressing the operation button). The high-speed imaging mode is terminated when stopping of the high-speed imaging is instructed by the user, or when a specified amount of the video signal imaged at high speed is recorded in the memory 105 (that is, when the available space in the memory 105 is exhausted).

Figure 5:
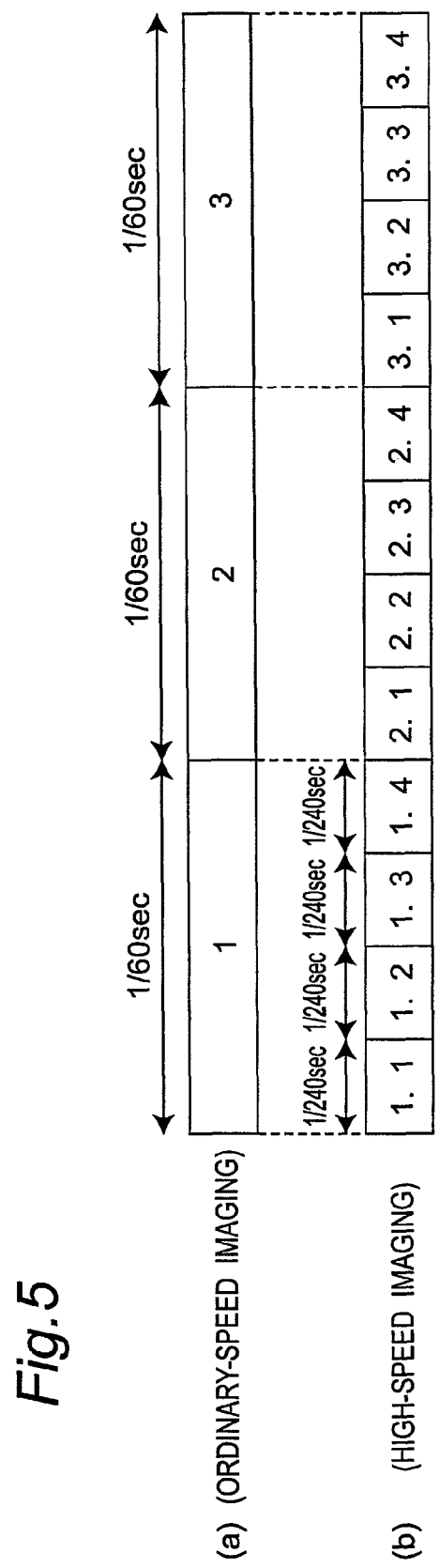
FIG. 5 is an explanatory diagram of output examples of output video signal of the imaging section, (a) showing an ordinary-speed imaging mode, and (b) showing a high-speed imaging mode.

When imaging in the ordinary-speed imaging mode, the drive circuit 202 in the imaging section 101 drives the CCD 201 so as to read out the field images (1, 2, 3, . . . ) at intervals of 1/60 second as shown in FIG. 5(a). On the other hand, when imaging in the high-speed imaging mode, the drive circuit 202 drives the CCD 201 so as to read out the field images (1.1, 1.2, 1.3, 1.4, . . . ) at ¼ of ordinary speed, that is, at intervals of 1/240 second as shown in FIG. 5(b).

2.1.1 Operation in Ordinary-Speed Imaging Mode

Figure 6:
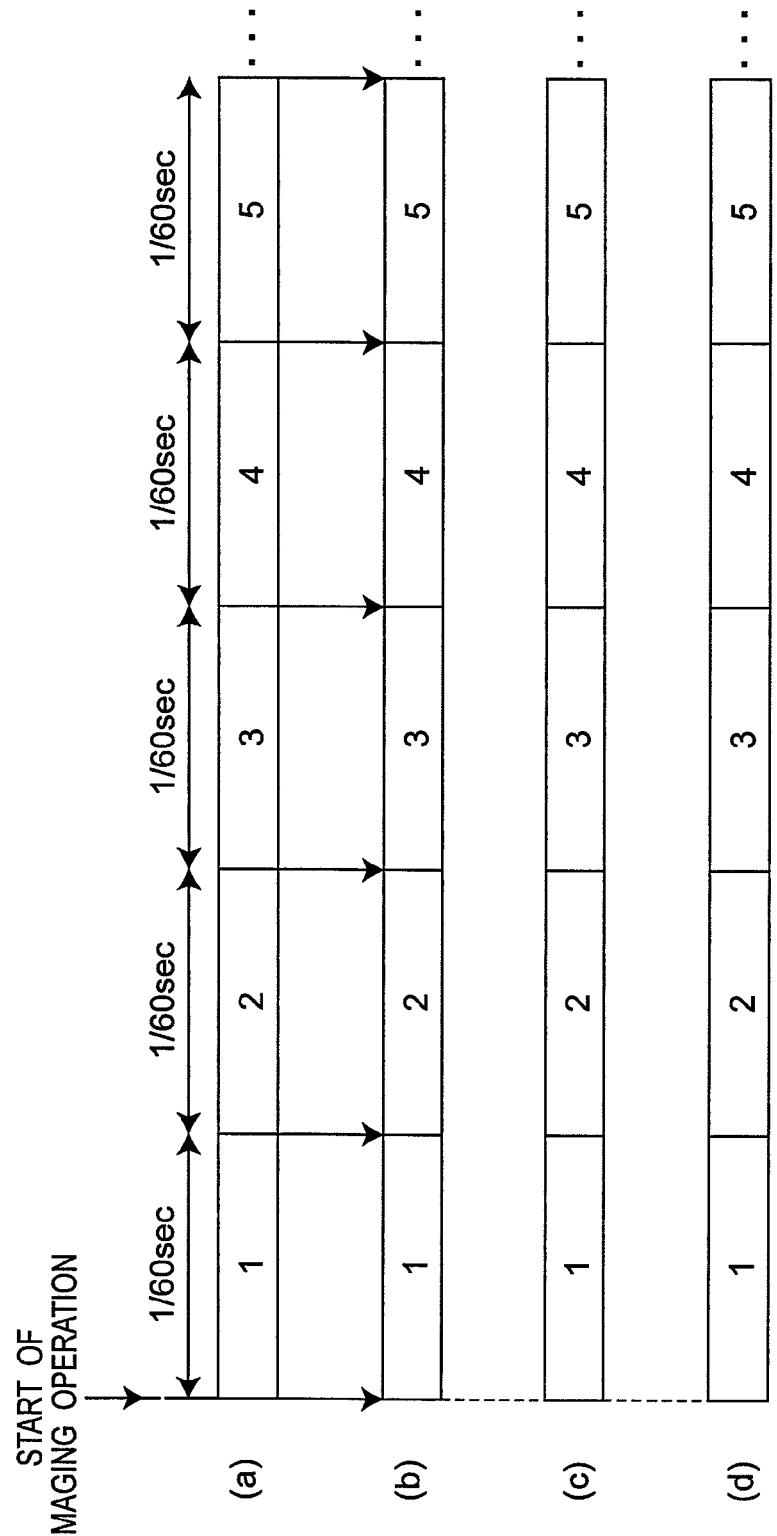
FIG. 6 is a diagram of video signal output of each section of the imaging device in ordinary-speed imaging mode, (a) showing the output of the imaging section, (b) showing the output of the video speed converting circuit, (c) showing the output of a recording signal selector, and (d) showing the output of a display signal selector.

The imaging operation in ordinary-speed imaging mode is explained. When the user manipulates the operation section 110 for instructing start of imaging operation, the imaging operation in ordinary-speed imaging mode is started. The operation section 110 sends a signal showing start of imaging operation to the system control circuit 111. The system control circuit 111 receives this signal, and operates the imaging section 101 in ordinary-speed imaging mode. As a result, the imaging section 101 sends out video signals at 60 fields per second, such as field sections 1, 2, 3, . . . as shown in FIG. 6(a). The A/D converter 102 converts the video signal from the imaging section 101 into a digital signal. The digital signal processing circuit 103 applies a signal processing relating to image processing to the converted video signal to send it to the video speed converting circuit 104 and the memory 105.

The video speed converting circuit 104 is controlled by the system control circuit 111, and applies a speed conversion process to the input video signal. In ordinary-speed imaging mode, the video speed converting circuit 104 is controlled so as not to process the speed conversion, and the video signal (see FIG. 6(b)) of same speed as the speed of input video signal (see FIG. 6(a)) is sent into the recording signal selector 106.

The memory 105 is controlled by the system control circuit 111 so as not to write the output video signal from the digital signal processing circuit 103 in ordinary-speed imaging mode.

The recording signal selector 106 and the display signal selector 108 are controlled by the system control circuit 111, so as to select the output (see FIG. 6(b)) of the video speed converting circuit 104, from the start of imaging operation. FIGS. 6(c) and (d) show the output signals of the recording signal selector 106 and the display signal selector 108, respectively. As a result, in the recording and reproducing section 107, the imaging video signal of ordinary speed output from the video speed converting circuit 104 is recorded. In the display section 109, the video of the imaging video signal of ordinary speed output from the video speed converting circuit 104 is displayed. The user refers to the display of the display section 109 and can recognize the imaged content.

The operation of the recording and reproducing section 107 is explained. The recording and reproducing section 107 records the output video signal of the recording signal selector 106 into the recording medium 503 in the imaging operation.

In ordinary-speed imaging mode, the recording and reproducing section 107 receives the video signal from the recording signal selector 106. The compression circuit 501 processes the entered video signal as specified, by block forming, DCT (discrete cosine transform) or quantizing, and reduces data volume. The video signal with the reduced data volume is sent to the interface circuit 502. The interface circuit 502 transforms the output video signal of the compression circuit 501 into a data format to be recorded in the recording medium 503, and writes the converted data into the recording medium 503.

2.1.2 Operation in High-Speed Imaging Mode

The imaging operation in high-speed imaging mode is explained. For example, the high-speed imaging mode is used when desired to image at slow speed at a certain moment during operation in ordinary-speed imaging mode. During operation in ordinary-speed imaging mode, when the user manipulates the operation section 110 to change to the high-speed imaging mode, the operation is as explained below.

Figure 7:
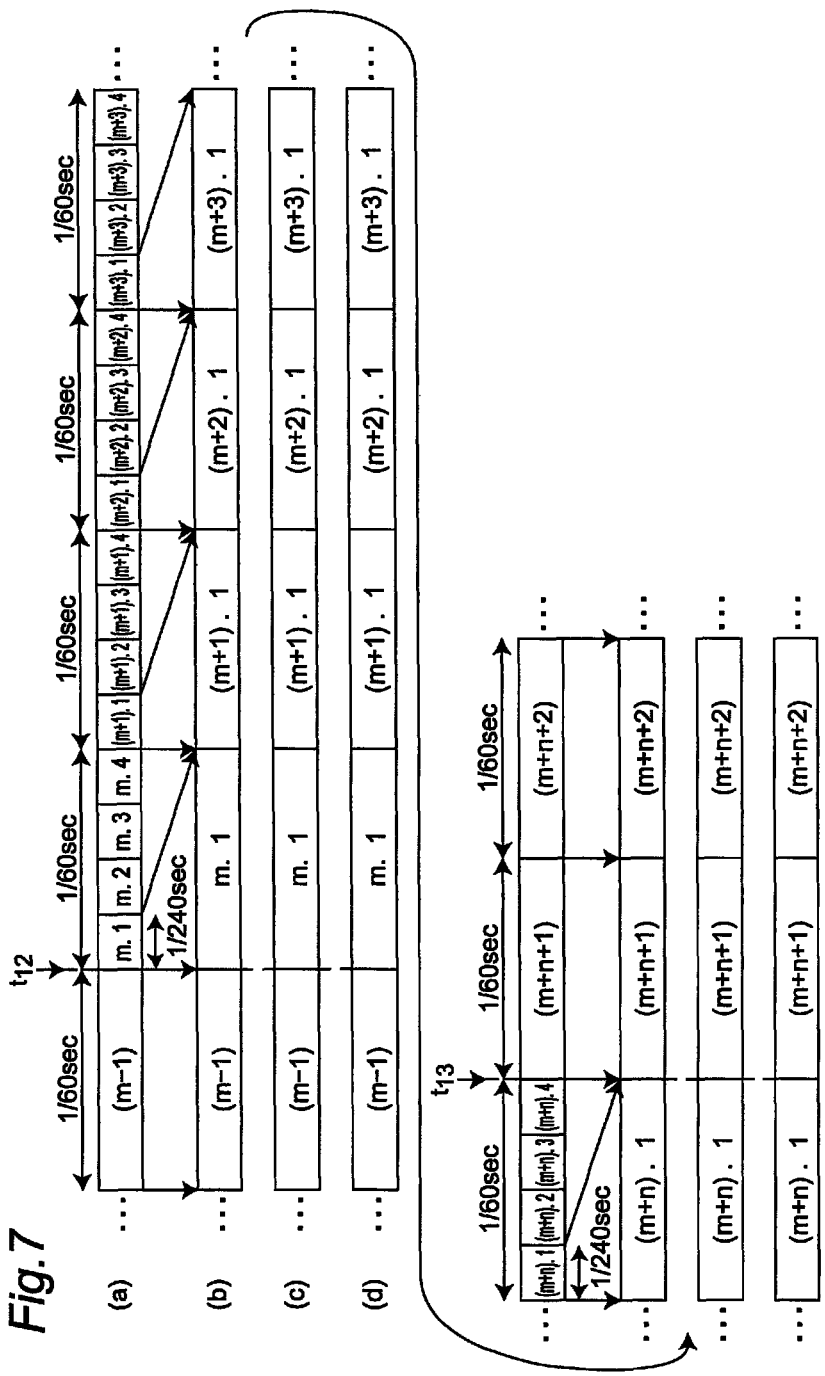
FIG. 7 is a diagram of video signal output of each section of the imaging device in high-speed imaging mode, (a) showing the output of the imaging section, (b) showing the output of the video speed converting circuit, (c) showing the output of the recording signal selector, and (d) showing the output of the display signal selector.

FIG. 7 is a diagram showing the transition of output signal of each section when the imaging mode is changed from ordinary-speed imaging mode to high-speed imaging mode. FIG. 7(a) to (d) show the outputs of the imaging section 101, the video speed converting circuit 104, the recording signal selector 106, and the display signal selector 108, respectively.

When the system control circuit 111 receives a signal showing change to high-speed imaging mode from the operation section 110, for example, when receiving a mode change instruction at timing t12 in FIG. 7, the imaging section 101 is changed to a high-speed imaging state. In this case, as shown in FIG. 7(a), up to field section (m−1), the imaging section 101 has been sending out video signals at 60 fields per second, but thereafter it sends out video signals at 240 fields per second, such as field section m.1, m.2, m.3, m.4, (m+1).1, . . . . This high-speed imaging video signal (video signal imaged at high speed) is processed in the A/D converter 102 and the digital signal processing circuit 103, and is sent out into the video speed converting circuit 104 and the memory 105.

The video speed converting circuit 104 does not convert the speed in ordinary-speed imaging mode, but in high-speed imaging mode, on the basis of control from the system control circuit 111, the speed of the video signal entered from the digital signal processing circuit 103 is converted from high speed (240 fields per second) to ordinary speed (60 fields per second). For example, in the input video signal at 240 fields per second shown in FIG. 7(a), by extracting the video signal at a rate of 1 field in every 4 fields, the video signal can be converted to 60 fields per second as shown in FIG. 7(b).

The display signal selector 108 is controlled by the system control circuit 111, and selects the output of the video speed converting circuit 104 same as in ordinary-speed imaging mode. As a result, as shown in FIG. 7(d), the display section 109 receives the video signal at 60 fields per second, same as in ordinary-speed imaging mode, and the display section 109 displays directly without any change in display control. Hence, the user can recognize the image being taken, via the display section 109 during high-speed imaging mode.

The recording signal selector 106 is also controlled by the system control circuit 111 so as to select the output of the video speed converting circuit 104 same as in ordinary-speed imaging mode. As a result, in the recording and reproducing section 107, the video signal at 60 fields per second is entered same as in ordinary-speed imaging mode. That is, as shown in FIG. 7(c), field sections m.1, (m+1).1, (m+2).1, . . . are entered.

The memory 105 is controlled by the system control circuit 111 so as to write the video signal from the digital signal processing circuit 103 in high-speed imaging mode. That is, the memory 105 is controlled so as to write in field sections m.1, m.2, m.3, m.4, (m+1).1, . . . as shown in FIG. 7(a).

That is, in the high-speed imaging mode, the video imaged at ordinary speed is recorded in the recording and reproducing section 107, and the video imaged at high speed is recorded in the memory 105. The image recorded in the memory 105 is transferred to the recording and reproducing section 107 after stopping of imaging operation, and is recorded (the detail is described below).

Since the memory 105 has a limited capacity, the high-speed imaging video signal can be stored by a specific number of fields, for example, for the portion of 4(n+1) fields. Therefore, by writing of video imaged at high speed, when the vacant region in the memory 105 is filled up, the high-speed imaging mode is stopped. That is, in the imaging device 10 of the embodiment, the high-speed imaging mode is stopped at the following timing, whichever the earlier of:

when the user commands stopping of operation in high-speed imaging mode; and when the available capacity of the memory 105 is exhausted.

In the example in FIG. 7, if the vacant capacity of the memory 105 is used up at the moment of writing of high-speed imaging video signal for the portion of 4(n+1) fields from m.1 to (m+n).4 (that is, timing t13), the system control circuit 111 instructs the memory 105 to stop writing. At the same time, the system control circuit 111 returns the control of the imaging section 101 and the video speed converting circuit 104 to the control in ordinary-speed imaging mode.

Thereafter, as shown in FIG. 7(b), from the imaging section 101 and the video speed converting circuit 104, the video signal at 60 fields per second is output to the recording and reproducing section 107 by way of the selector 106, such as field sections (m+n+1), (m+n+2), . . .

2.1.3 Operation When Stopping Imaging Operation

As mentioned above, when stopping of a series of imaging operation is commanded, in the high-speed imaging mode, the video signal recorded in the memory 105 is transferred to the recording and reproducing section 107, and is recorded. This operation is explained below.

Figure 8:
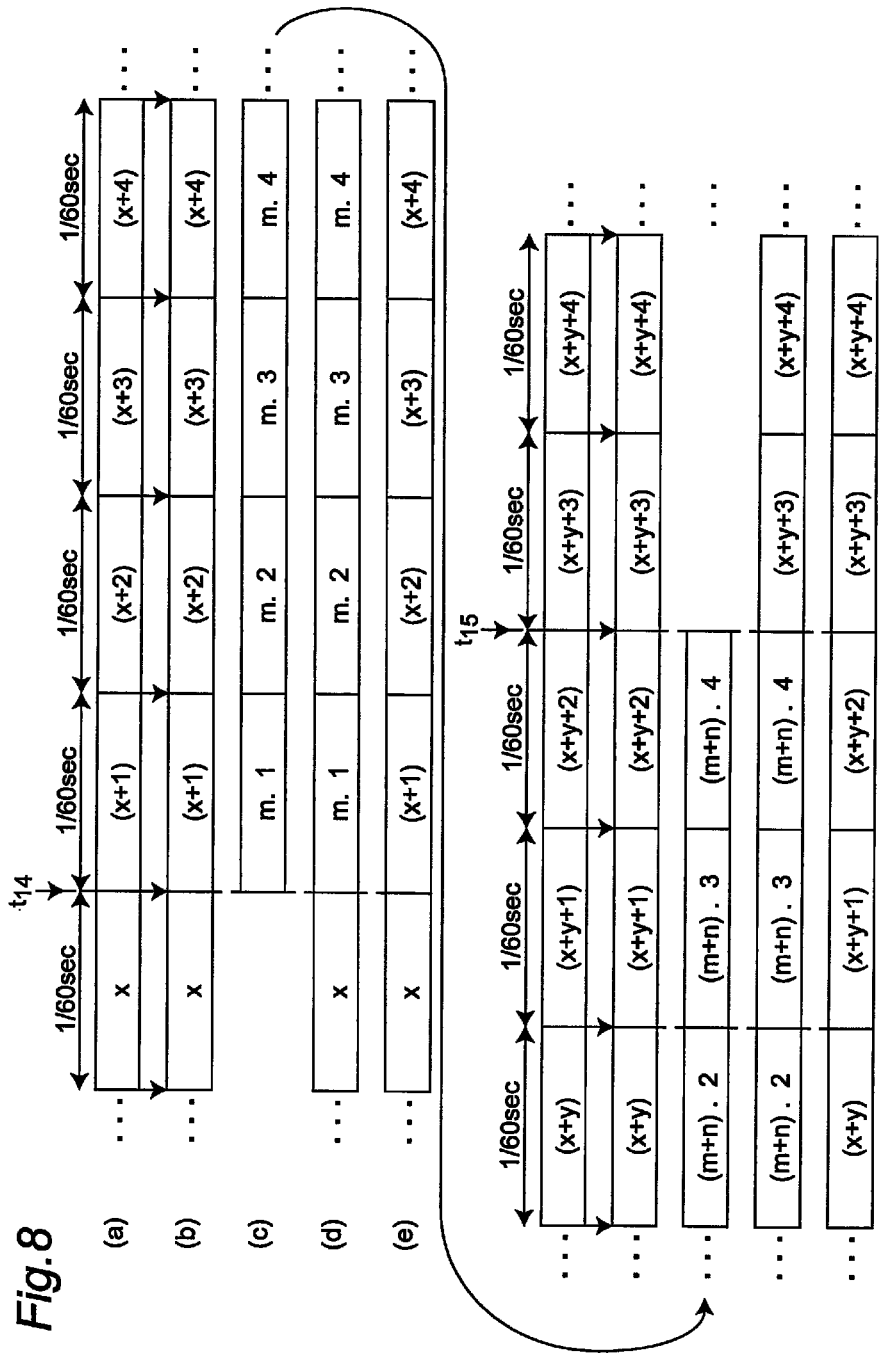
FIG. 8 is a diagram of video signal output of each section of the imaging device after stopping command of imaging operation, (a) showing the output of a digital signal processing circuit, (b) showing the output of the video speed converting circuit, (c) showing the output of a memory, (d) showing the output of the recording signal selector, and (e) showing the output of the display signal selector.

FIG. 8 is a diagram showing the transition of video signal when the imaging operation is stopped in the embodiment. FIG. 8(a) to (e) show the outputs of the digital signal processing circuit 103, the video speed converting circuit 104, the memory 105, the recording signal selector 106, and the display signal selector 108, respectively. In the diagram, timing t14 is the timing of is stopping operation of imaging operation on the operation section 110 by the user.

The system control circuit 111 receives a command signal for stopping the imaging operation from the operation section 110 at timing t14, and controls the memory 105 to read out the stored high-speed imaging video signal. By this control, as shown in FIG. 8(c), the memory 105 reads out the high-speed imaging video signal for the portion of 4(n+1) fields, from m.1 to (m+n).4, at a speed of 60 fields per second.

At the same time, the system control circuit 111 controls the recording signal selector 106 to select the output signal of the memory 105. As a result, in the recording and reproducing section 107, the video signal being read out from the memory 105 is entered by way of the recording signal selector 106.

In the recording and reproducing section 107, this high-speed imaging video signal is recorded in the recording medium 503. As the high-speed imaging video signal entered in the recording and reproducing section 107 is at a speed of 60 fields per second, the recording and reproducing section 107 can record without changing the recording speed of the video signals. When the recording and reproducing section 107 finishes recording up to field section (m+n).4, recording is stopped at timing t15 in FIG. 8.

At this time, the reproduction sequence generating circuit 112 generates a reproduction sequence signal by the control from the system control circuit 111.

The imaging section 101, after stopping of the imaging operation, continues to outputs video signals successively in ordinary-speed imaging mode at 60 fields per second. For example, as shown in FIG. 8(a) and others, the video signal is continuously output such as (x+1), (x+2), . . . field sections. Therefore the user can recognize the subject to be imaged next. For the same purpose, the A/D converter 102, the digital signal processing circuit 103, the video speed converting circuit 104, the selector 108, and the display section 109 operate same as in the ordinary-speed imaging mode.

2.1.4 Generation and Recording of Reproduction Sequence Signal

By referring to an example of execution of imaging operation along the time line shown in FIG. 9(a), generation and recording of reproduction sequence signal are explained. The reproduction sequence signal is a signal to be referred to when reproducing the recorded video signal in a correct time relation, and is generated by the reproduction sequence generating circuit 112, and is recorded in the recording and reproducing section 107.

In the time line shown in FIG. 9(a), at timing t11, the user instructs starting of imaging operation, and stopping of imaging operation is instructed at timing t14. In this period, at timing t12, the user instructs starting of high-speed imaging operation, and the high-speed imaging mode is terminated at timing t13. That is, the imaging operation is executed in high-speed imaging mode from timing t12 to timing t13, and the imaging operation is executed in ordinary-speed imaging mode from timing t11 to timing t12, and after timing t13.

During high-speed imaging mode, the video signal is recorded at both ordinary speed and high speed. Hence, at the moment of timing t14, video signals B, C and D imaged at ordinary speed from timing t11 to t14 are recorded in the recording and reproducing section 107 (recording medium 503), and video signal E imaged at high speed from timing t12 to t13 is recorded in the memory 105. The video signal E recorded in the memory 105 is later transferred to the recording and reproducing section 107, and is recorded as video signal E'.

Figure 9:
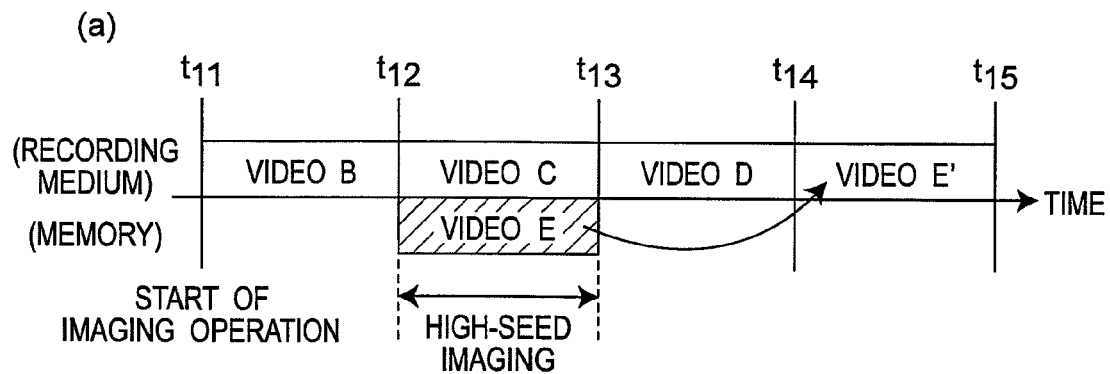
FIG. 9 relates to embodiment 1, (a) showing the time line of imaging operation, and (b) showing the data recorded in the recording medium in the recording and reproducing section.
Figure 9:
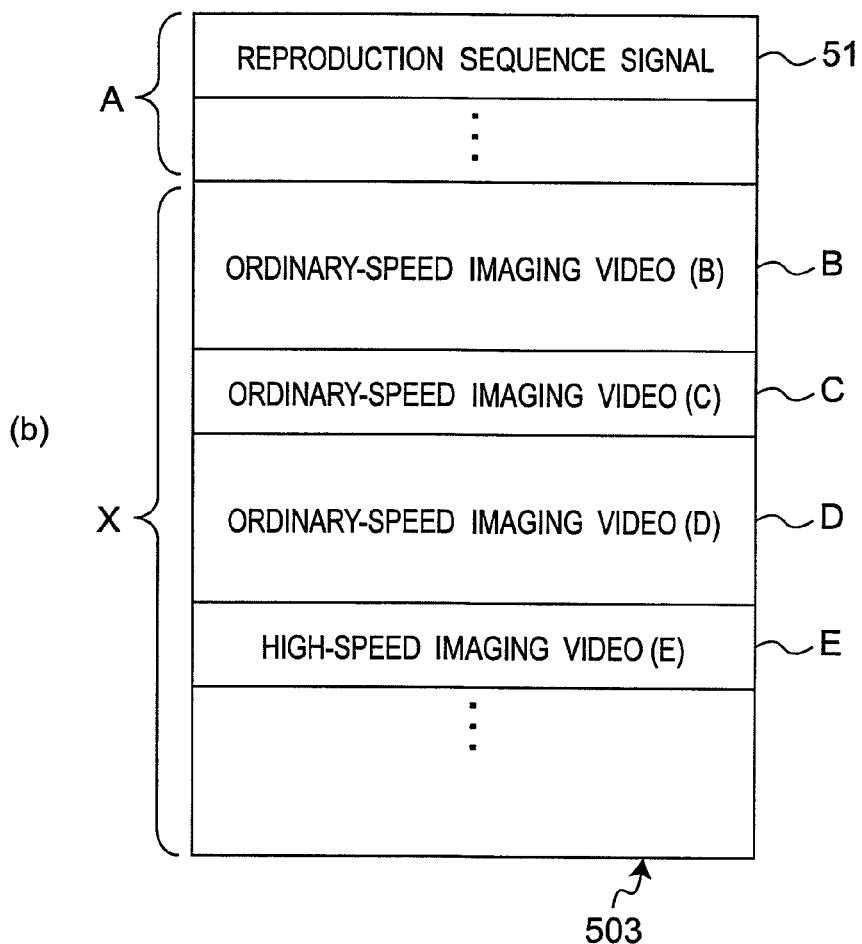

FIG. 9(b) is a diagram showing the recording region in the recording medium 503 of the recording and reproducing section 107 when the imaging operation is executed along the time line shown in FIG. 9 (a). The recording medium 503 has a region (A) for recording the reproduction sequence signal, and a region (X) for recording the video signal. A region 51 in the region (A) is a recording region of reproduction sequence signal. Regions (B), (C), (D) in the region (X) are recording regions of video signals B, C and D imaged at ordinary speed, respectively. A region (E) is a recording region of video signal E' transferred from the memory 105.

At timing t11, when the imaging operation starts in ordinary-speed mode, video signals imaged at ordinary speed (for example, field images 1, 2, 3, . . . shown in FIG. 6(c)) are written into the recording medium 503 of the recording and reproducing section 107. At this time, the signals are sequentially written from the beginning of an unrecorded region (for example, region (B)) in the recording medium 503. At the same time, the reproduction sequence generating circuit 112 generates a reproduction sequence signal showing the beginning of the region to be reproduced in the first place, in a series of video from the imaging start at the present moment till stopping, and sends out to the recording and reproducing section 107. This reproduction sequence signal is passed through the interface circuit 502, and is recorded in the region (A) other than the recording region of video signal in the recording medium 503. For example, in FIG. 9(b), the first reproducing region is the region (B), and the reproduction sequence signal showing the beginning position (address) of the region (B) is written in sequentially from the beginning of the unrecorded region in the region (A).

At timing t12, when operation of high-speed imaging mode is started, the recording and reproducing section 107 records video signals form the beginning of the region (C) following the region (B). At this time, the reproduction sequence generating circuit 112 generates the reproduction sequence signal including the following information:
 The end of the first reproducing region is the final point of the region (B) (that is, the terminal position of the first reproducing region);
 the beginning of the second reproducing region is the beginning of the region (C) (that is, the starting position of the second reproducing region); and
 the region (C) is a region of recording of video signal imaged at ordinary speed.

The generated reproduction sequence signal is recorded in an unrecorded region following the recorded region in the region (A).

At timing t13, when the high-speed imaging mode is terminated, the recording and reproducing section 107 starts to record the video signals from the beginning of the region (D) following the region (C). At this time, the reproduction sequence generating circuit 112 generates the reproduction sequence signal including the following information:
 the end of the second reproducing region is the final point of the region (C) (that is, the terminal position of the second reproducing region); and
 the beginning of the third reproducing region is the beginning of the region (D) (that is, the starting position of the third reproducing region).

The generated reproduction sequence signal is recorded next to the previous recording region in the region (A).

At timing t14, when stopping of imaging operation is instructed, and recording of the video signal E recorded in the memory 105 into the recording and reproducing section 107 is started, the reproduction sequence generating circuit 112 generates the reproduction sequence signal showing that the end of the third reproducing region is the final point of the region (D) (that is, the end position of the third reproducing region). This reproduction sequence signal is recorded in the region (A). Further, the reproduction sequence generating circuit 112 generates the reproduction sequence signal including the following information:

the beginning of the second reproducing region is the beginning of the region (E) (that is, the starting position of the second reproducing region); and the region (E) is a region of recording of video signal imaged at high speed.

The generated reproduction sequence signal is recorded in the region (A).

Finally, when recording of the video signal E' into the recording and reproducing section 107 is terminated (at timing t15 in FIG. 8), the reproduction sequence generating circuit 112 generates a signal showing that the end of the second reproducing region is the final point of the region (E) (that is, the terminal position of the second reproducing region), and records in the region (A).

The reproduction sequence signal thus generated is referred to when reproducing the video signal recorded in the recording and reproducing section 107 (recording medium 503), and the recorded video signal can be reproduced in a correct time sequence.

2.2 Reproduction Operation

The reproduction operation is explained. The reproduction operation is started when the user manipulates the operation section 110 to command start of reproduction operation. As a result, the operation section 110 outputs a reproduction operation start signal to the system control circuit 111. The system control circuit 111 receives this signal, and reads out the reproduction sequence signal showing the reproduction sequence of the regions (B) to (E) shown in FIG. 9(*b*) from the region (A). On the basis of the reproduction sequence signal being read out, the video signals are read out from the recording and reproducing section 107 at a speed of 60 fields per second.

Figure 10:
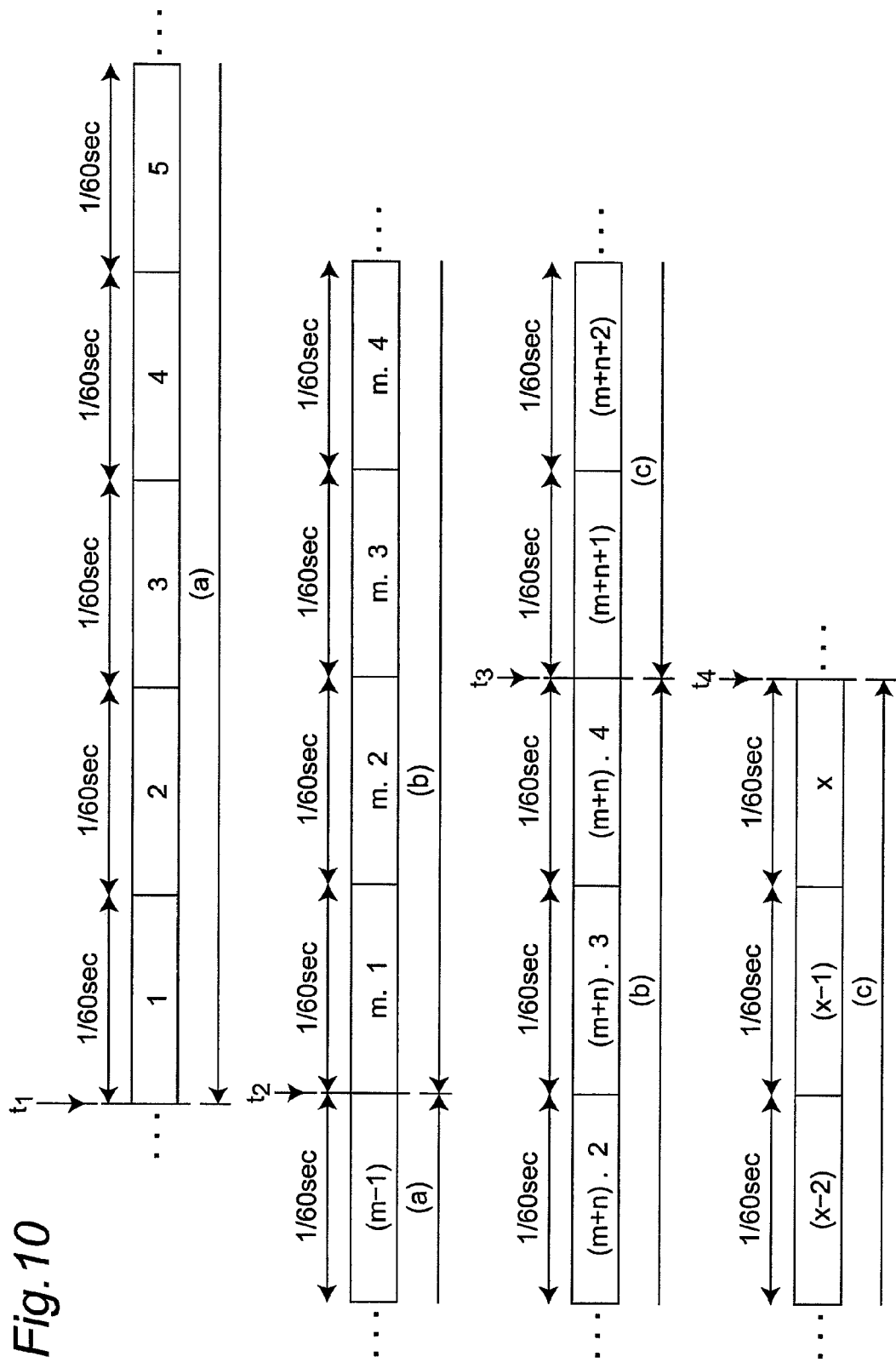
FIG. 10 is an explanatory diagram of video signal being read out from the recording and reproducing section at the time of reproducing.

FIG. 10 is a diagram showing an example of video signals being read out from the recording and reproducing section 107. For example, when the reproduction is started at timing t1 shown in FIG. 10, the recording and reproducing section 107 first reads out the video signal recorded in the region (B) in FIG. 9. That is, as shown in section (a) in FIG. 10, field sections 1, 2, 3, . . . , (m−1) are read out at intervals of ⅟₆₀ second.

The second reproducing signal to be reproduced is the video signal recorded in either of regions (C) or (E) shown in FIG. 9(*b*). That is, when the user desires an ordinary reproduction, the video signal is reproduced from the region (C) recording the video signal imaged at ordinary speed, or when a slow reproduction is desired, the video signal is reproduced from the region (E) recording the video signal imaged at high speed. It depends on the decision of the user. When the user manipulates the operation section 110 and commands a desired reproduction (ordinary reproduction or slow reproduction), the operation section 110 outputs the command signal to the system control circuit 111.

The information showing the video signal imaged at high speed is recorded whether in the region (C) or in the video recording region (E) is recorded in the region (A) as mentioned above. The system control circuit 111 refers to the information in the region (A), and reproduces from either the region (C) or the region (E) depending on the signal from the operation section 110. For example, when the user instructs the slow reproduction, that is, when instructed to reproduce the video signal in the region (E), as shown in section (b) in FIG. 10, the high-speed imaging videos for the portion of 4(n+1) fields, that is, m.1, m.2, . . . , (m+n).4 are output from the recording and reproducing section 107 at intervals of ⅟₆₀ second. That is, the high-speed imaging videos are reproduced in slow mode.

After reproduction from the second region, region (C) or (E), successively, the video signals are read out from the third reproducing region, that is, the region (D). That is, as shown in section (c) in FIG. 10, field sections (m+n+1), . . . , x are read out at intervals of ⅟₆₀ second. When no other recorded video signal is available, for example, the reproduction is stopped at timing t2 in FIG. 10, or when other recorded video signal is available, the video signal is successively reproduced similarly.

Thus, in this embodiment, during high-speed imaging operation, the video signal imaged at high speed is stored in the memory 105, and after high-speed imaging operation, the video signal stored in the memory 105 is transferred and recorded in the recording and reproducing section 107. Accordingly, during high-speed imaging operation, it is not required to operate the recording and reproducing section 107 including the compression circuit and other sections at high speed, and the recording and reproducing section 107 may not be configured to be applicable to high-speed operation. Hence, expensive parts are not needed in the recording and reproducing section 107. The operation frequency of the recording and reproducing section 107 is not required to be high. Therefore, high-speed imaging is realized without using expensive parts, and the cost is not increased as compared with the conventional imaging device, and the power consumption is not increased due to high operation frequency.

In addition, since the reproduction sequence signal is recorded at the time of high-speed imaging, by referring to this signal at the time of reproduction, the reproduction of data imaged at ordinary-speed can be transferred to the reproduction of data imaged at high-speed (that is, slow reproduction), and can be returned to the reproduction of data imaged at ordinary-speed, and the series of reproduction operations can be executed continuously. In the high-speed imaging period, the ordinary video signal of 60 fields per second is also recorded, and the user can select, at the time of reproduction, either slow reproduction of the video imaged at high-speed or the display of the video imaged at ordinary-speed, and the convenience for the user is enhanced.

Embodiment 2

Figure 11:
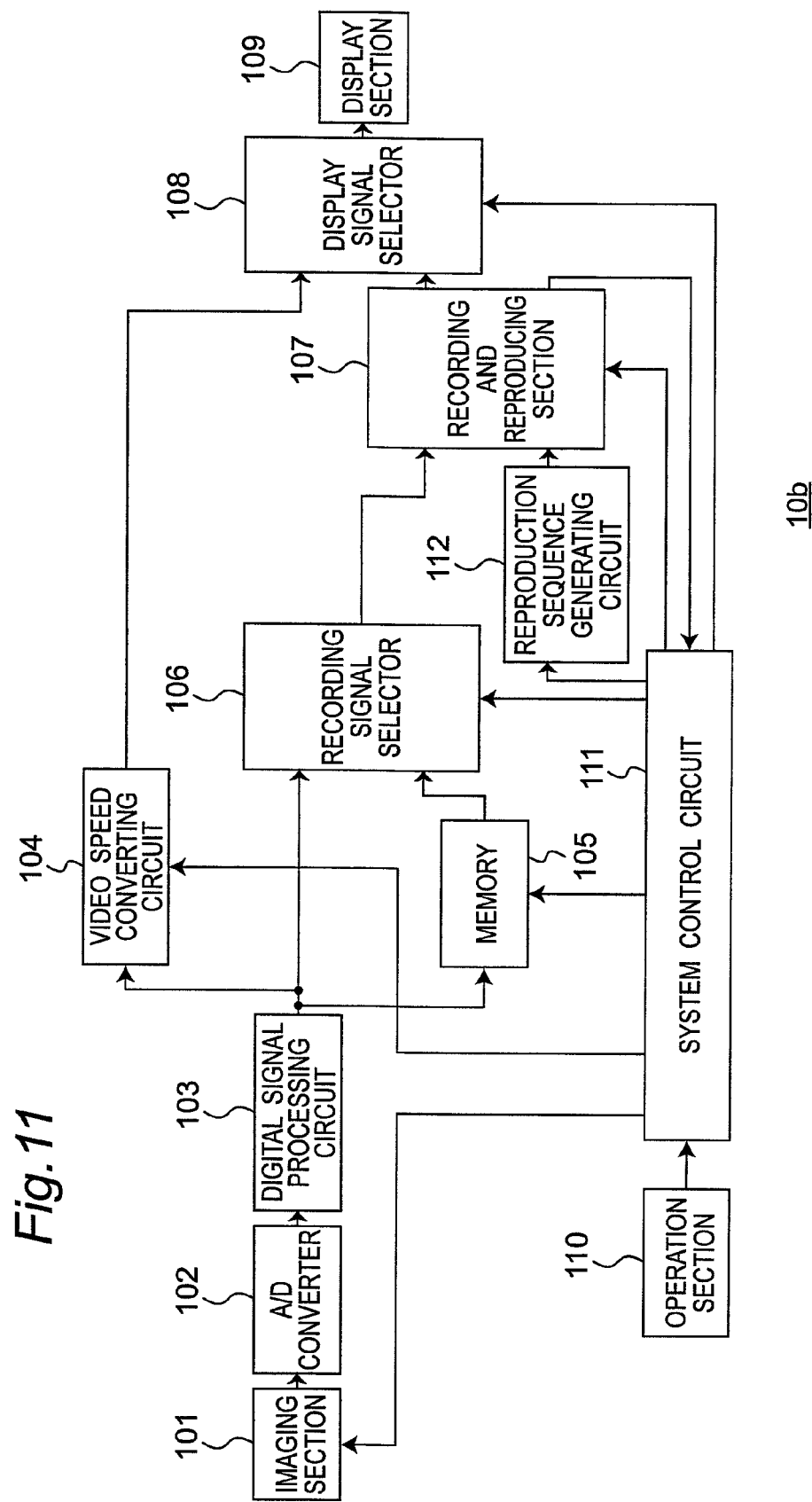
FIG. 11 is a block diagram of configuration of an imaging device in embodiment 2 of the present invention.

FIG. 11 is a block diagram of configuration of an imaging device in embodiment 2 of the present invention. In embodiment 1, the recording signal selector 106 selects and outputs either the output of the video speed converting circuit 104 or the output of the memory 105. In this embodiment, the recording signal selector 106 selects and outputs either the output of the digital signal processing circuit 103 or the output of the memory 105. The other configuration is same as in embodiment 1.

That is, what this embodiment differs from embodiment 1 lies mainly in the operation of the recording signal selector 106, and the operation of the reproduction sequence generating circuit 112 and the recording and reproducing section 107 when the imaging speed state of the imaging section is changed to the high-speed imaging by manipulating the operation section 110 during imaging operation, hence these operations are mainly explained below.

The imaging operation is explained below according to the time line shown in FIG. 12(a). In the time line shown in FIG. 12(a), at timing t11, the user instructs start of imaging operation, and stopping of imaging operation is instructed at timing t14. In this period, at timing t12, the user instructs a high-speed imaging mode, and the high-speed imaging mode is terminated at timing t13.

In an imaging device 10b, after start of imaging, while operating in the ordinary-speed imaging mode, the video is output at 60 fields per second same as in embodiment 1 from the imaging section 101 to the digital signal processing circuit 103. The recording signal selector 106 is controlled by the system control circuit 111, and selects the output of the digital signal processing circuit 103, and sends to the recording and reproducing section 107. The recording and reproducing section 107 and the reproduction sequence generating circuit 112 operate same as in embodiment 1. That is, as shown in FIG. 12(b), the recording and reproducing section 107 records the video signal output from the recording signal selector 106 in the region (B), and the reproduction sequence signal from the reproduction signal generating circuit 112 into the region (A). At this time, the reproduction sequence generating circuit 112 generates a reproduction sequence signal showing that the beginning of the region to be reproduced in the first place is the beginning of the region (B) in the series of video from start of present imaging till stop, and sends out to the recording and reproducing section 107.

As shown in FIG. 12(a), at timing t12, the operation is changed from the ordinary-speed imaging mode to the high-speed imaging mode. FIG. 13 is a diagram showing the transition of video signals in this embodiment when the imaging mode is changed. FIG. 13(a) to (d) show the outputs of the imaging section 101, the video speed converting circuit 104, the recording signal selector 106, and the display signal selector 108, respectively.

The imaging section 101, the video speed converting circuit 104, the selector 108, the display section 109, and the memory 105 operate same as in embodiment 1. That is, in FIG. 13, for example, at timing t12, when the imaging section 101 is controlled in the high-speed imaging state, as shown in FIG. 13(a), the imaging section 101 delivers the video signals at 240 fields per second. The video speed converting circuit 104 converts the speed from 240 frames per second to 60 frames per second. This output video signal is sent out to the display section 109 by way of the selector 108.

The memory 105 records the high-speed imaging video signal from the digital signal processing circuit 103. At timing t13, when the vacant region in the memory 105 is filled up, or when the user manipulates the operation section 110 to instruct stopping of the high-speed imaging mode, the memory 105 stops writing. At the same time, the control of the imaging section 101 is returned to the control in ordinary-speed imaging mode.

The recording signal selector 106 continues, in high-speed imaging mode, that is, in section (a) in FIG. 13, to send out the video signals at 240 frames per second from the digital signal processing circuit 103. The video signals are put into the recording and reproducing section 107. However, the system control means 111 controls the recording and reproducing section 107 not to record the video signals in this period. That is, in this embodiment, during high-speed imaging mode, unlike embodiment 1, the video signal imaged at ordinary-speed is not recorded in the recording and reproducing section 107.

Figure 12:
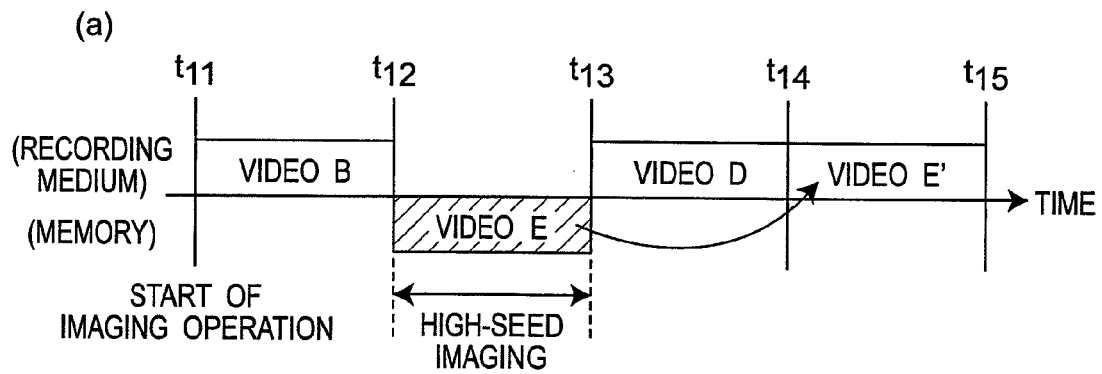
FIG. 12 relates to embodiment 2, (a) showing the time line of imaging operation, and (b) showing the data recorded in the recording medium in the recording and reproducing section.
Figure 12:
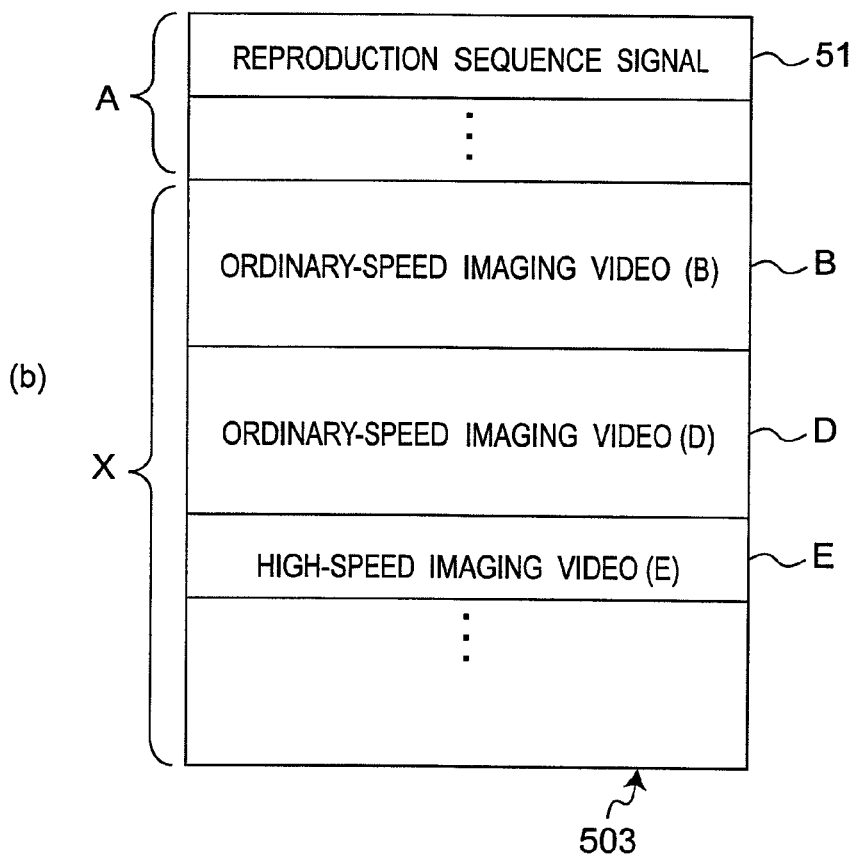
Figure 13:
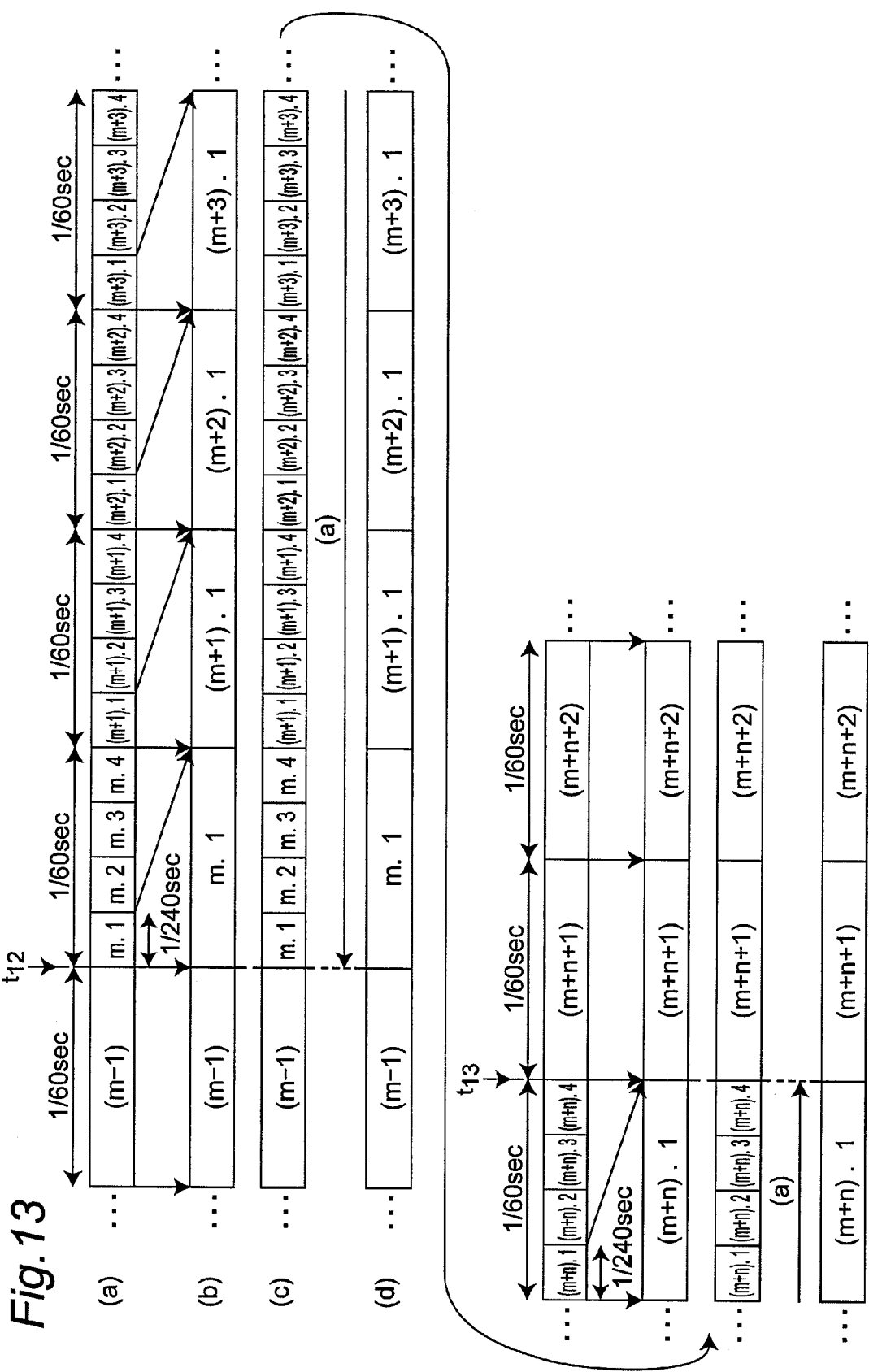
FIG. 13 is a diagram of video signal output of each section of the imaging device in high-speed imaging mode in embodiment 2, (a) showing the output of the imaging section, (b) showing the output of the video speed converting circuit, (c) showing the output of the recording signal selector, and (d) showing the output of the display signal selector.
Figure 14:
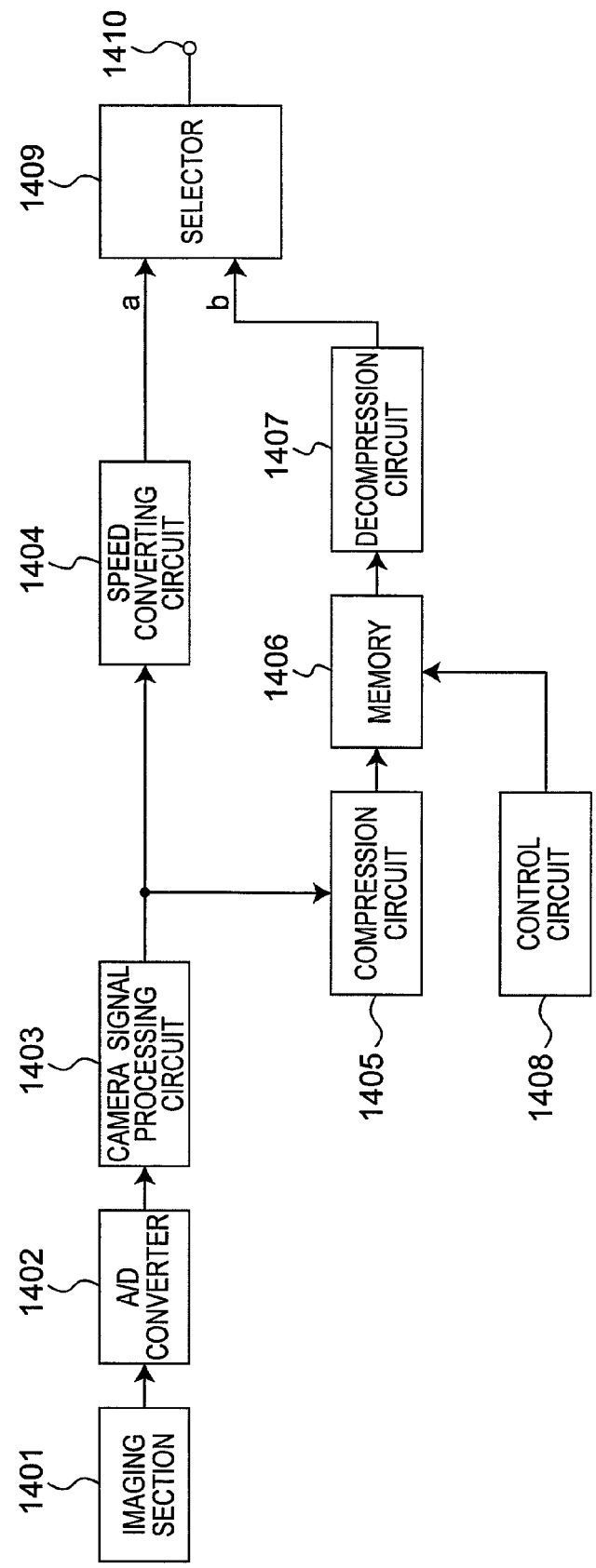
FIG. 14 is a block diagram of configuration of a conventional imaging device.

The reproduction sequence generating circuit 112, at timing t12 of changeover from ordinary-speed imaging mode to high-speed imaging mode, generates a reproduction sequence signal showing that the end of the first reproducing region is the final point of the region (B) in FIG. 12, and records in the region (A).

At timing t13 of return from high-speed imaging mode to ordinary-speed imaging mode, the recording and reproducing section 107 resumes recording, and records the ordinary-speed video signal from the recording signal selector 106 from the beginning of the region (D) following the region (B). At the same timing, the reproduction sequence generating circuit 112 generates a signal showing that the beginning of the third reproducing region is the beginning of the region (D), and records in the reproduction sequence recording region (A).

Later, at timing t14, the user manipulates the operation section 110 to instruct stopping of imaging operation. In this case, the memory 105, the reproduction sequence generating circuit 112, and the recording and reproducing section 107 operate same as in embodiment 1. That is, from the memory 105, the recorded high-speed imaging video signals are read out at a speed of 60 fields per second. At the same time, the system control circuit 111 controls the recording signal selector 106 to select the output signals from the memory 105. In the recording and reproducing section 107, the video signal of the memory 105 is entered by way of the selector 106, and is recorded from the beginning of the region (E) following the region (D) in FIG. 12(b). The high-speed imaging video signal entered in the recording and reproducing section 107 is at a speed of 60 fields per second, same as in embodiment 1, and change of recording speed of video signal is not needed in the recording and reproducing section 107.

On the other hand, the reproduction sequence generating circuit 112, at the timing of start of recoding of the video signal imaged at high-speed from the memory 105 into the recording and reproducing section 107, generates a signal showing that the end of the third reproducing region is the final point of the region (D), and records in the region (A), and also generates a signal showing that the beginning of the second reproducing region is the beginning of the region (E), and records in the region (A). At the timing of writing of all video signals imaged at high-speed into the recording and reproducing section 107, a reproduction sequence signal showing that the end of the second reproducing region is the final point of the region (E) is generated, and recorded in the region (A).

The reproduction operation is the same as in embodiment 1. That is, when start of reproduction is instructed on the operation section 110, the system control circuit 111 reads out the reproduction sequence signal showing the reproduction sequence of the region (B) to (E), from the region (A) shown in FIG. 12. The recording and reproducing section 107 reads out the video signal at a speed of 60 fields per second on the basis of the reproduction sequence signal, and sends out to the display section 109 by way of the display signal selector 108. In this embodiment, different from embodiment 1, the second reproducing region is nothing but the region (E) for recording the high-speed imaging video signal, and the reproduction sequence is region (B), region (D), and region (E). While reproducing region (E), the video imaged at a speed of 240 fields per second is reproduced at a speed of 60 fields per second, hence a slow reproduction is realized. The other operation is the same as in embodiment 1.

By such operations, in this embodiment, same as in embodiment 1, high-speed imaging is realized at low cost, and increase of power consumption can be suppressed, and a series of reproduction operation of the video imaged at ordinary-speed and the video imaged at high-speed can be executed without interruption during reproduction. Furthermore, during high-speed imaging period, nothing is recorded in the recording and reproducing section 107, and the recording region is saved by the corresponding portion.

MODIFIED EXAMPLES

In the foregoing embodiments, the regions (B) to (E) for recording the video signals in the recording medium of the recording and reproducing region 107 are supposed to be a continuous region. However, the regions (B) to (E) may not necessarily be continuous because the signals showing the beginning and the end of each region are recorded in the region (A).

In the foregoing embodiments, the imaging element of the imaging section 101 is a CCD-type imaging element, but may not be limited to this, and the same effects are obtained by, for example, a CMOS-type imaging element.

In the foregoing embodiments, the speed converting method of the video speed converting circuit 104 is a simple thinning method of fields, but, for example, the speed may be converted by summing up signals of plural fields, and determining the signal of one field. This method is effective for suppressing the deterioration of S/N due to shortness of accumulation time in the imaging element at the time of high-speed imaging.

In the foregoing embodiments, the video interval at the time of high-speed imaging is specified as ¼ of the video interval at the time of ordinary-speed imaging, but may not be limited to this. The video interval is not particularly specified, and as far as it is shorter than that in ordinary-speed imaging mode, it is acceptable.

In the foregoing embodiments, the region (A) for recording the reproduction sequence signal of the recording and reproducing section 107 may not necessarily be at the beginning of entire recording regions of the recording medium.

In the foregoing embodiments, there is the advantage that the control is simple when the imaging speed at the time of high-speed imaging is integer times of the imaging speed at the time of ordinary-speed imaging, but it may not be limited to integer times alone.

Industrial Applicability

The present invention can be applied, with an inexpensive configuration, to high-speed imaging and slow reproduction applications. Thus the present invention is applicable to an imaging device in a wide range, such as a video camera, which uses a recording medium including a semiconductor memory or an optical disk.

The present invention is herein described by referring to specific embodiments, but may be changed or modified, or used in other application, as evident for those who are skilled in this field. Hence the present invention is not limited to the illustrated embodiments alone, but may be limited only by the scope of the claims herein. The present application relates to Japanese Patent Application Laid-Open No. 2006-301158 (filed on Nov. 7, 2006), which is incorporated herein by reference.

The invention claimed is:

1. An imaging device capable of recording a video signal generated by imaging a subject at a first frame rate and a video signal generated by imaging a subject at a second frame rate slower than the first frame rate, the imaging device comprising:
an operating section that sets an imaging frame rate at the first frame rate or the second frame rate;
an imaging senor that generates a video signal of the imaging frame rate set by the operating section;
a first storage medium that stores a video signal of the first frame rate imaged by the imaging sensor;
a second storage medium; and
a controller that:
i) converts the video signal of the first frame rate imaged by the imaging sensor to a video signal of the second frame rate;
ii) records the converted video signal of the second frame rate or the video signal of the first frame rate from the first storage medium in the second storage medium, the recorded video signal being divided and managed in a plurality of reproducing regions, the video signal of the first frame rate stored in the first storage medium being recorded in the second storage medium at a different timing from the timing the converted video signal of the second frame rate is recorded in the second storage medium; and
iii) generates a reproduction sequence signal including information showing a reproduction sequence of each of the reproducing regions of the video signal recorded in the second storage medium, and records the reproduction sequence signal in the second storage medium,
wherein the reproduction sequence signal includes information to be referred to when reproducing the video signal recorded in the second storage medium such that each of the reproducing regions of the video signal recorded in the second storage medium is reproduced in a correct time sequence,
wherein the video signal recorded in the second storage medium includes the video signal of the first frame rate and the converted video signal of the second frame rate, the video signal of the first frame rate being recorded in the second storage medium at the different timing from the timing the converted video signal of the second frame rate is recorded in the second storage medium, and
wherein the reproduction sequence signal includes information showing a reproduction sequence of (i) each reproducing region of the video signal of the first frame rate and (ii) each reproducing region of the video signal of the second frame rate such that each of the reproducing regions of the video signal recorded in the second storage medium is reproduced in the correct time sequence.

2. The imaging device according to claim 1, wherein the controller generates the reproduction sequence signal when the imaging period of the imaging sensor is changed over by the operating section or when the video signal of the first frame rate from the first storage medium is recorded in the second storage medium.

3. The imaging device according to claim 1, wherein the controller generates the video signal of the second frame rate by thinning the video signal of the first frame rate imaged by the imaging sensor.

4. The imaging device according to claim 1, wherein the controller generates the video signal of the second frame rate by calculating the weighted mean of part of the video signal of the first frame rate imaged by the imaging sensor.

5. The imaging device according to claim 1, wherein the reproduction sequence signal includes information showing the starting position and the end position of each of the reproducing regions of the video signal recorded in the second storage medium, and information showing the reproduction sequence of each of the reproducing regions of the video signal recorded in the second storage medium.

6. The imaging device according to claim 1, wherein the reproduction sequence signal includes information showing that the video signal recorded in the second storage medium is imaged at the first frame rate when the video signal of the first frame rate is recorded in the second storage medium.

7. The imaging device according to claim 1, wherein the controller has a function of reproducing the recorded video signal based on the reproduction sequence signal.

8. The imaging device according to claim 1, wherein the second storage medium is a volatile memory.

9. The imaging device according to claim 1, wherein the second storage medium includes, as a recording medium, a non-volatile memory, an optical disk, or a hard disk.

10. The imaging device according to claim 1, wherein the ratio of the first frame rate and the second frame rate is an integer.

11. An imaging device capable of recording a video signal generated by imaging a subject at a first frame rate and a video signal generated by imaging a subject at a second frame rate slower than the first frame rate, the imaging device comprising:
an operating section that sets an imaging frame rate at the first frame rate or the second frame rate;
an imaging sensor that generates a video signal of the imaging frame rate set by the operating section;
a first storage medium that stores the video signal of the first frame rate imaged by the imaging sensor;
a second storage medium; and
a controller that:
i) records the video signal of the second frame rate from the imaging sensor or the video signal of the first frame rate from the first storage medium in the second storage medium, the recorded video signal being divided and managed in a plurality of reproducing regions, the video signal of the first frame rate stored in the first storage medium being recorded in the second storage medium at a different timing from the timing the video signal of the second frame rate from the imaging sensor is recorded in the second storage medium; and
ii) generates a reproduction sequence signal including information showing a reproduction sequence of each of the reproducing regions of the video signal recorded in the second storage medium, and records the reproduction sequence signal in the second storage medium,
wherein the reproduction sequence signal includes information to be referred to when reproducing the video signal recorded in the second storage medium such that each of the reproducing regions of the video signal recorded in the second storage medium is reproduced in a correct time sequence,
wherein the video signal recorded in the second storage medium includes the video signal of the first frame rate and the video signal of the second frame rate, the video signal of the first frame rate being recorded in the second storage medium at the different timing from the timing the video signal of the second frame rate is recorded in the second storage medium, and
wherein the reproduction sequence signal includes information showing a reproduction sequence of (i) each reproducing region of the video signal of the first frame rate and (ii) each reproducing region of the video signal of the second frame rate such that each of the reproducing regions of the video signal recorded in the second storage medium is reproduced in the correct time sequence.

12. The imaging device according to claim 11, wherein the controller generates the reproduction sequence signal when the imaging period of the imaging section is changed over by the operating section or when the video signal of the first frame rate from the first storage medium is recorded in the second storage medium.

13. The imaging device according to claim 11, wherein the reproduction sequence signal includes information showing the starting position and the end position of each of the reproducing regions of the video signal recorded in the second storage medium, and information showing the reproduction sequence of each of the reproducing regions of the video signal recorded in the second storage medium.

14. The imaging device according to claim 11, wherein the reproduction sequence signal includes information showing that the video signal recorded in the second storage medium is imaged at the first frame rate when the video signal of the first frame rate is recorded in the second storage medium.

15. The imaging device according to claim 11, wherein the controller has a function of reproducing the recorded video signal based on the reproduction sequence signal.

16. The imaging device according to claim 11, wherein the second storage medium is a volatile memory.

17. The imaging device according to claim 11, wherein the second storage medium includes, as a recording medium, a non-volatile memory, an optical disk, or a hard disk.

18. The imaging device according to claim 11, wherein the ratio of the first frame rate and the second frame rate is an integer.

19. An imaging device comprising:
an image sensor that generates a video signal of a first frame rate;
a first storage medium that stores the video signal of the first frame rate generated by the image sensor;
a second storage medium; and
a controller that:
i) converts the video signal of the first frame rate, stored in the first storage medium, to a video signal of a second frame rate that is slower than the first frame rate;
ii) records the converted video signal of the second frame rate or the video signal of the first frame rate from the first storage medium in the second storage medium, the recorded video signal being divided and managed in a plurality of reproducing regions, the video signal of the first frame rate stored in the first storage medium being recorded in the second storage medium at a different timing from the timing the converted video signal of the second frame rate is recorded in the second storage medium; and
iii) generates a reproduction sequence signal including information showing a reproduction sequence of each of the reproducing regions of the video signal recorded in the second storage medium, and records the reproduction sequence signal in the second storage medium,
wherein the reproduction sequence signal includes information to be referred to when reproducing the video signal recorded in the second storage medium such that each of the reproducing regions of the video signal recorded in the second storage medium is reproduced in a correct time sequence,
wherein the video signal recorded in the second storage medium includes the video signal of the first frame rate and the converted video signal of the second frame rate, the video signal of the first frame rate being recorded in the second storage medium at the different timing from the timing the converted video signal of the second frame rate is recorded in the second storage medium, and wherein the reproduction sequence signal includes information showing a reproduction sequence of (i) each reproducing region of the video signal of the first frame rate and (ii) each reproducing region of the video signal of the second frame rate such that each of the reproducing regions of the video signal recorded in the second storage medium is reproduced in the correct time sequence.

20. An imaging device comprising:

an image sensor that generates a video signal of a first frame rate or a video signal of a second frame rate that is slower than the first frame rate;

a first storage medium that stores the video signal of the first frame rate generated by the image sensor;

a second storage medium; and a controller that:
  i) records the video signal of the second frame rate from the imaging sensor or the video signal of the first frame rate from the first storage medium in the second storage medium, the recorded video signal being divided and managed in a plurality of reproducing regions, the video signal of the first frame rate stored in the first storage medium being recorded in the second storage medium at a different timing from the timing the video signal of the second frame rate from the imaging sensor is recorded in the second storage medium; and
  ii) generates a reproduction sequence signal including information showing a reproduction sequence of each of the reproducing regions of the video signal recorded in the second storage medium, and records the reproduction sequence signal in the second storage medium, wherein the reproduction sequence signal includes information to be referred to when reproducing the video signal recorded in the second storage medium such that each of the reproducing regions of the video signal recorded in the second storage medium is reproduced in a correct time sequence, wherein the video signal recorded in the second storage medium includes the video signal of the first frame rate and the video signal of the second frame rate, the video signal of the first frame rate being recorded in the second storage medium at the different timing from the timing the video signal of the second frame rate is recorded in the second storage medium, and wherein the reproduction sequence signal includes information showing a reproduction sequence of (i) each reproducing region of the video signal of the first frame rate and (ii) each reproducing region of the video signal of the second frame rate such that each of the reproducing regions of the video signal recorded in the second storage medium is reproduced in the correct time sequence.

* * * * *